(12) United States Patent
Hirabayashi

(10) Patent No.: US 11,719,324 B2
(45) Date of Patent: Aug. 8, 2023

(54) WORM AND ROTATING DEVICE

(71) Applicant: MINEBEA MITSUMI Inc., Nagano (JP)

(72) Inventor: Koichiro Hirabayashi, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 110 days.

(21) Appl. No.: 17/422,277

(22) PCT Filed: Dec. 24, 2019

(86) PCT No.: PCT/JP2019/050683
§ 371 (c)(1),
(2) Date: Jul. 12, 2021

(87) PCT Pub. No.: WO2020/149119
PCT Pub. Date: Jul. 23, 2020

(65) Prior Publication Data
US 2022/0107015 A1    Apr. 7, 2022

(30) Foreign Application Priority Data

Jan. 16, 2019  (JP) .................................. 2019-005212

(51) Int. Cl.
*F16H 55/22* (2006.01)
*F16H 25/16* (2006.01)
(Continued)

(52) U.S. Cl.
CPC ............. *F16H 55/22* (2013.01); *F16H 25/16* (2013.01); *F16H 55/06* (2013.01); *F16H 2025/249* (2013.01)

(58) Field of Classification Search
CPC .................................. F16H 55/22; F16H 55/06
See application file for complete search history.

(56) References Cited

U.S. PATENT DOCUMENTS

| 2011/0006627 | A1 | 1/2011 | Shimoyama et al. |
| 2018/0034345 | A1* | 2/2018 | Hirabayashi ......... H02K 7/1166 |

(Continued)

FOREIGN PATENT DOCUMENTS

| DE | 102005044467 B3 * | 3/2007 | ............. B60N 2/067 |
| JP | 2005-094919 A | 4/2005 | |

(Continued)

OTHER PUBLICATIONS

International Search Report for corresponding International Application No. PCT/JP2019/050683 dated Feb. 18, 2020.

(Continued)

*Primary Examiner* — Terence Boes
(74) *Attorney, Agent, or Firm* — Pearne & Gordon LLP

(57) ABSTRACT

A worm (40) according to an embodiment is a worm made of resin and formed by injection molding. The worm includes a gear portion (40*a*), a cavity (40*c*) having an axis being a longitudinal axis (40*d*) of the worm being formed at the gear portion, and a top portion (40*b*) formed at a first end portion of the gear portion in a direction of the longitudinal axis. A plurality of recesses (40*e*) including a hole portion communicating with the cavity are formed at the top portion in a radial direction, and are located on an outer peripheral portion side of the gear portion with respect to the cavity.

8 Claims, 15 Drawing Sheets

(51) Int. Cl.
*F16H 55/06* (2006.01)
*F16H 25/24* (2006.01)

(56) References Cited

U.S. PATENT DOCUMENTS

| | | | |
|---|---|---|---|
| 2021/0203208 A1* | 7/2021 | Hirabayashi | F16C 17/10 |
| 2021/0376693 A1* | 12/2021 | Nishimura | H02K 7/1166 |
| 2022/0109343 A1* | 4/2022 | Hirabayashi | H02K 13/10 |
| 2022/0268350 A1* | 8/2022 | Hirabayashi | H02K 5/225 |

FOREIGN PATENT DOCUMENTS

| | | |
|---|---|---|
| JP | 2005-265169 A | 9/2005 |
| WO | 2009/022524 A1 | 2/2009 |

OTHER PUBLICATIONS

Written Opinion for corresponding International Application No. PCT/JP2019/050683 dated Feb. 18, 2020.
English translation of the Written Opinion for corresponding International Application No. PCT/JP2019/050683 dated Feb. 18, 2020.
Notice of Reasons for Refusal dated Sep. 6, 2022 for corresponding Japanese Application No. 2019-005212 and English translation.

* cited by examiner

1

WORM AND ROTATING DEVICE

CROSS-REFERENCE TO RELATED APPLICATIONS

This application is a U.S. National Stage application that claims the benefit of PCT Application PCT/JP2019/050683, filed on Dec. 24, 2019, which claims the benefit of Japanese Application 2019-005212 filed Jan. 16, 2019, the entire disclosures of which are hereby incorporated herein by reference.

TECHNICAL FIELD

The present invention relates to a worm and a rotating device.

BACKGROUND ART

In the related art, there is known a worm having a hole for establishing communication between an insertion hole and the outside and allowing air in the insertion hole to escape in order to, when a shaft is inserted into the insertion hole, prevent the shaft from falling out from the insertion hole due to air compressed in the insertion hole.

CITATION LIST

Patent Literature

Patent Literature 1: JP 2005-94919 A

SUMMARY OF INVENTION

Technical Problem

However, when the above-described worm is manufactured by injection molding using a resin material, there is a case where an end of a pin of the mold used for forming the insertion hole for the shaft cannot be supported in the radial direction of the shaft. In other words, the pin of the mold is supported at only one end, and as a result, the molding may be performed while the pin of the mold is inclined due to injection pressure of the resin. If a worm is molded while the pin of the mold is inclined, use of the worm may result in generation of vibration or unusual noise when the worm is meshed with a worm wheel or a helical gear.

This problem is an example of a problem to be solved by the present invention, and an object of the present invention is to provide a worm capable of preventing generation of vibration or unusual noise.

Solution to Problem

A worm according to an aspect of the present invention is a worm made of resin and formed by injection molding. The worm includes a gear portion, a cavity having an axis being a longitudinal axis of the worm being formed at the gear portion, and a top portion formed at a first end portion of the gear portion in a direction of the longitudinal axis. A plurality of recesses including a hole portion communicating with the cavity are formed at the top portion in a radial direction, the plurality of recesses being located on an outer peripheral portion side of the gear portion with respect to the cavity.

DESCRIPTION OF EMBODIMENTS

Figure 1:
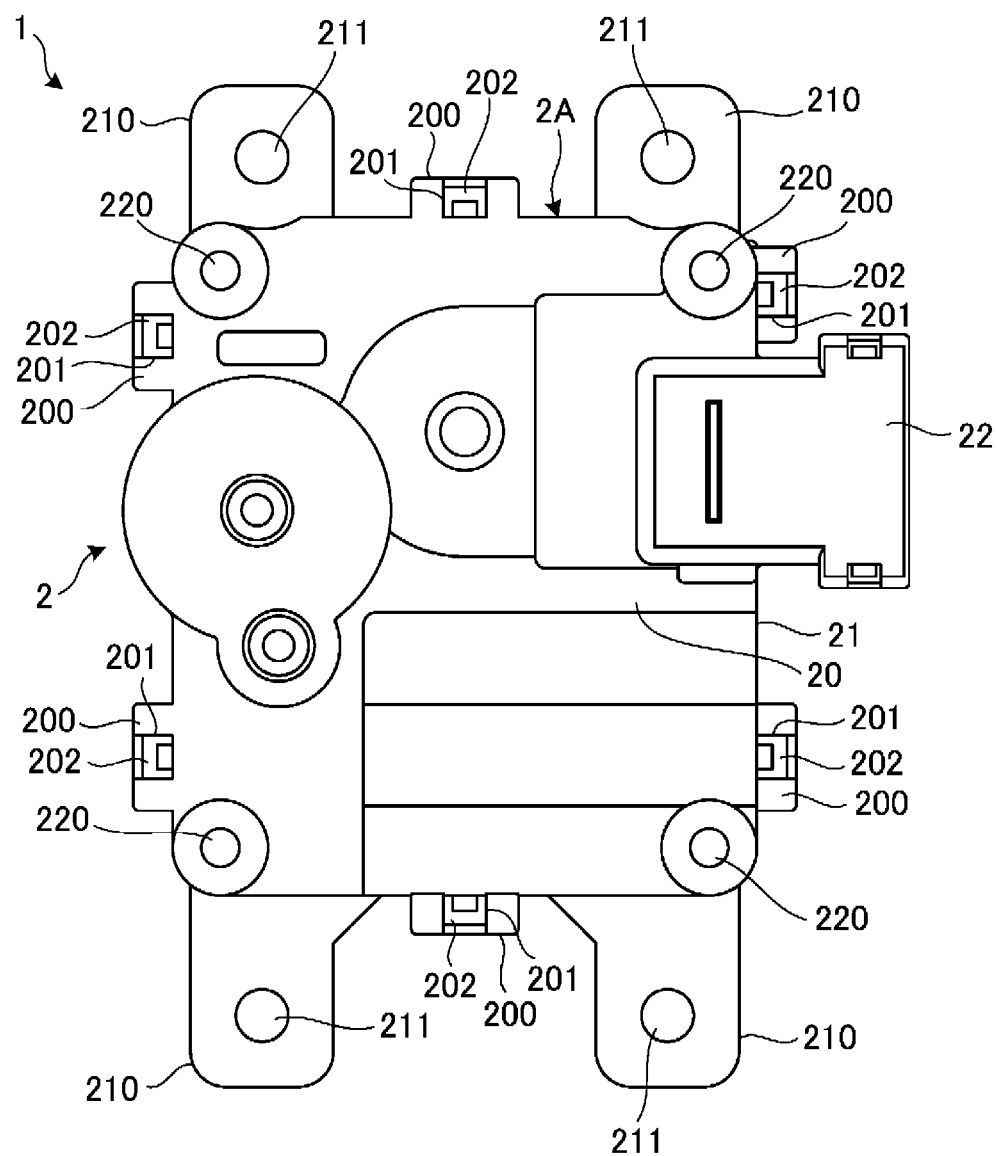
FIG. 1 is a plan view of a rotating device according to an embodiment.

A worm and a motor according to an embodiment will be described below with reference to the drawings. The worm according to the embodiment is provided in the motor. The motor is provided in a rotating device.

Note that the embodiment described below is not intended to limit the application of the worm and the motor. Furthermore, it should be noted that the drawings are schematic drawings and the dimensional relationships, proportions, and the like between elements in the drawings may differ from reality. In addition, among the drawings, the dimensional relationships and proportions may not necessarily be the same.

Figure 2:
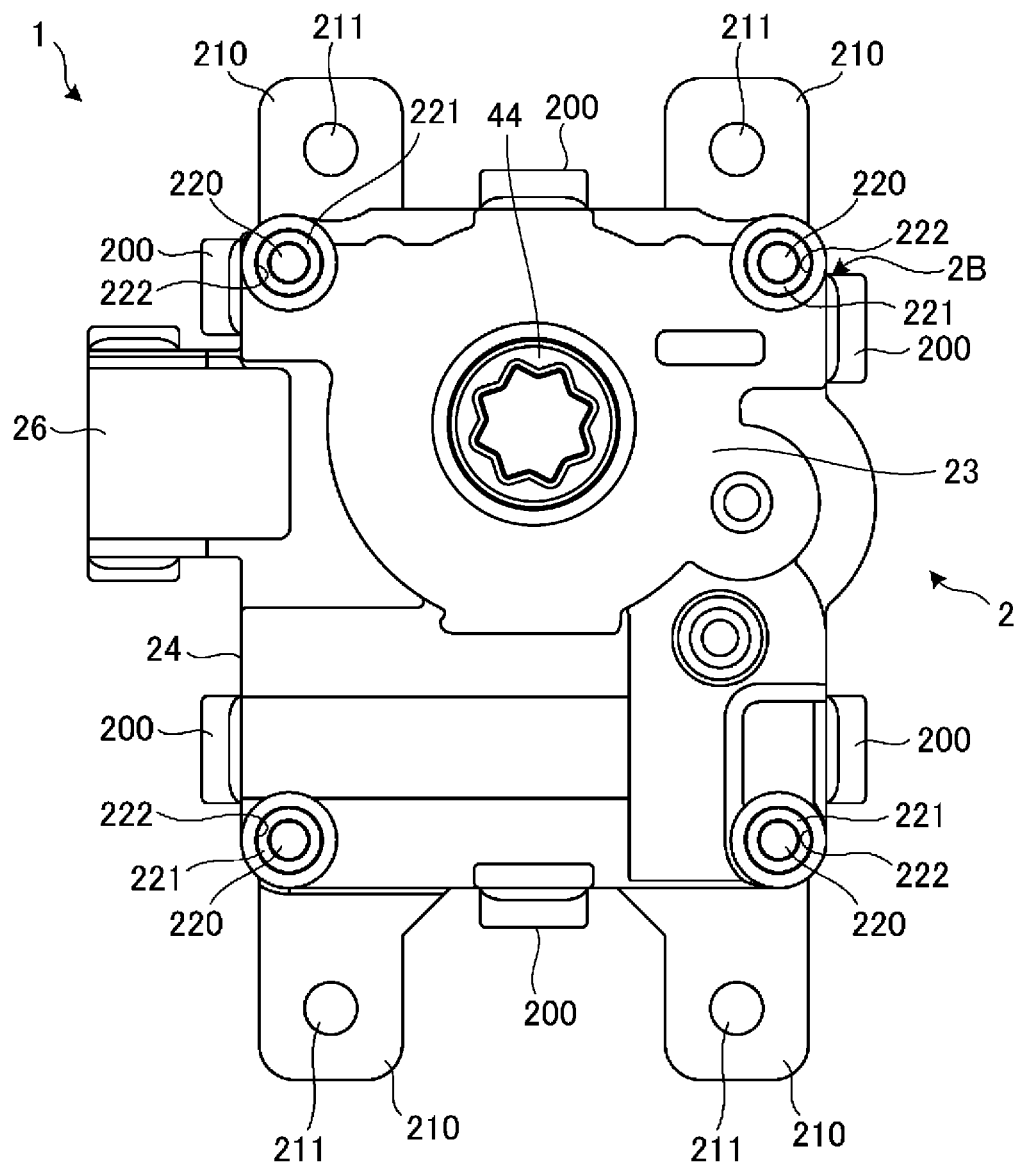
FIG. 2 is a bottom view of the rotating device according to the embodiment.
Figure 3:
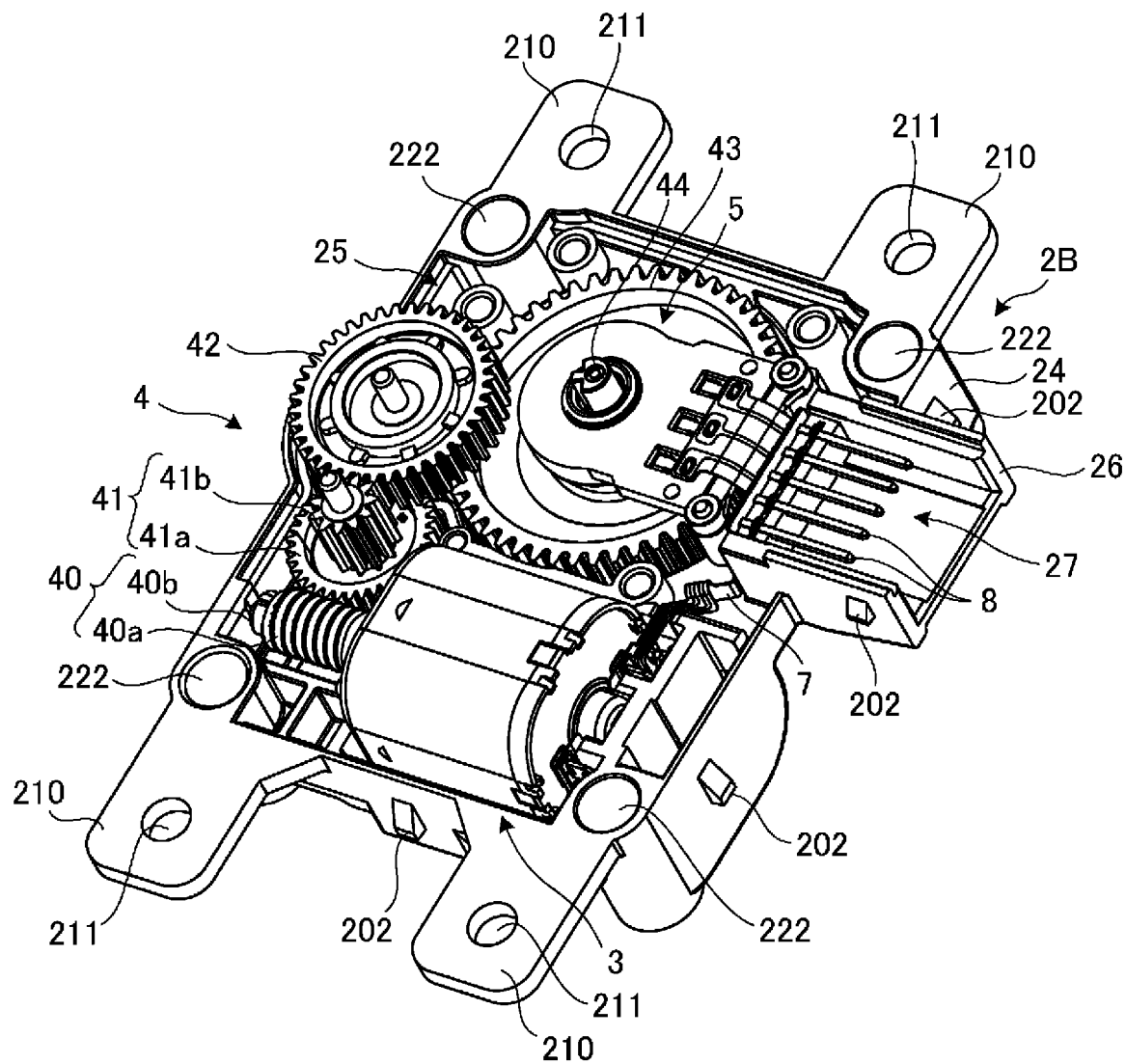
FIG. 3 is a perspective view of the rotating device according to the embodiment when a first casing is removed.
Figure 4:
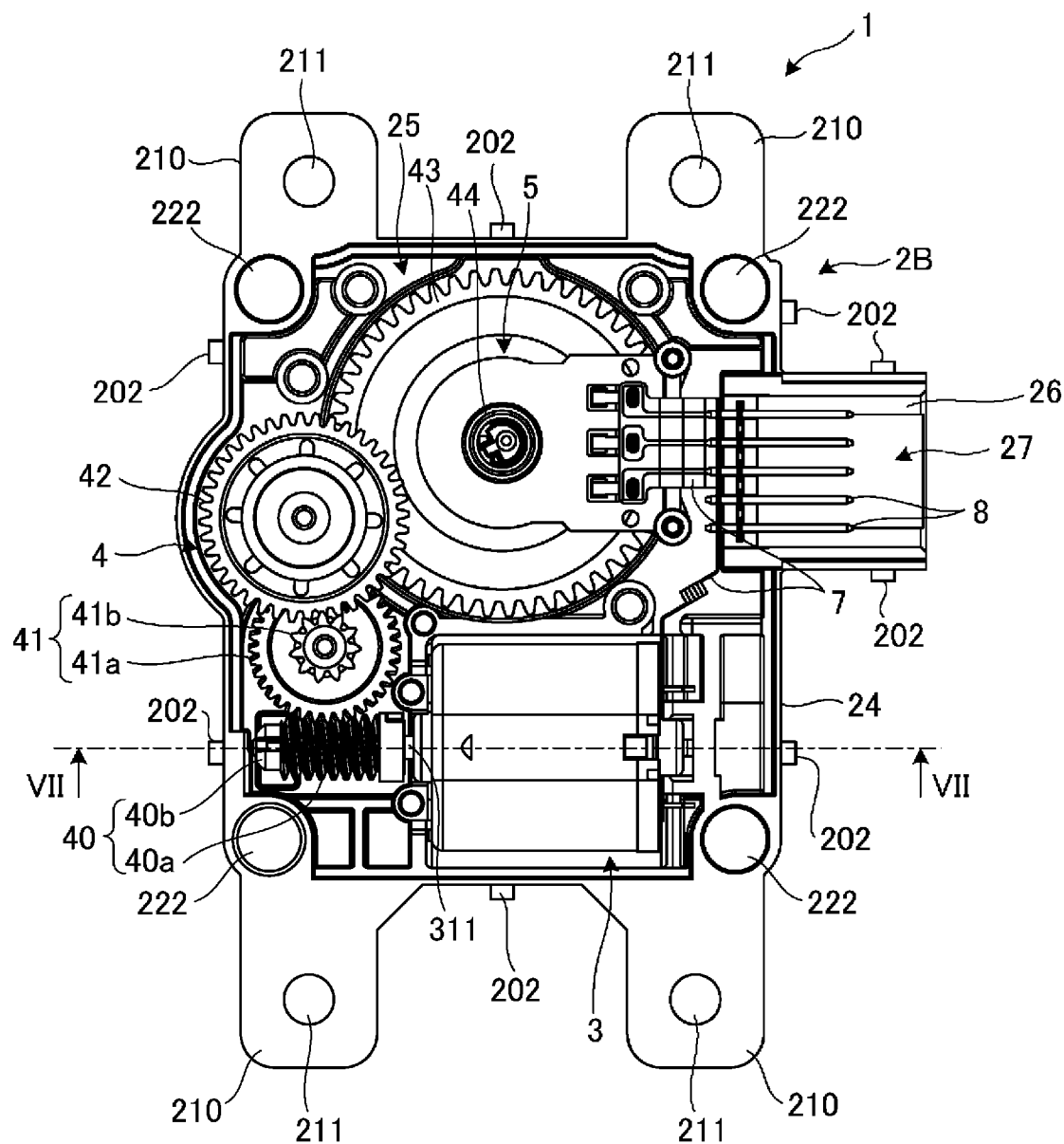
FIG. 4 is a plan view of the rotating device according to the embodiment when the first casing is removed.

A rotating device 1 according to the embodiment will be described with reference to FIGS. 1 to 4. FIG. 1 is a plan view of a rotating device 1 according to the embodiment. FIG. 2 is a bottom view of the rotating device 1 according to the embodiment. FIG. 3 is a perspective view of the rotating device 1 according to the embodiment when a first casing 2A is removed. FIG. 4 is a plan view of the rotating device 1 according to the embodiment when the first casing 2A is removed.

The rotating device 1 can be suitably used as an actuator used in an air conditioning system for a vehicle, for example, and can control the turning operation of louvers for controlling air flow or the like.

The rotating device 1 includes a casing 2, a motor 3, a set of gears 4 (gear mechanism), and a rotation angle detection sensor 5.

The casing 2 includes a first casing 2A and a second casing 2B. The casing 2 accommodates the motor 3, the set of gears 4, and the rotation angle detection sensor 5.

The first casing 2A includes a first surface portion 20 forming a top surface portion of the casing 2, and a first side wall portion 21 provided at an outer peripheral portion of the first surface portion 20. An opening (not illustrated) surrounded by the first side wall portion 21 is formed in the first casing 2A so as to oppose the first surface portion 20.

Further, a first insertion portion 22 for receiving an external connector (not illustrated) is formed in the first side wall portion 21 of the first casing 2A.

The second casing 2B includes a second surface portion 23 forming a bottom surface portion of the casing 2, and a second side wall portion 24 provided at an outer peripheral portion of the second surface portion 23. An opening 25 surrounded by the second side wall portion 24 is formed in the second casing 2B so as to oppose the second surface portion 23. Further, a second insertion portion 26 for receiving an external connector (not illustrated) is formed in the second side wall portion 24 of the second casing 2B.

The casing 2 is formed by the first casing 2A and the second casing 2B being coupled together in a state where the opening of the first casing 2A and the opening 25 of the second casing 2B oppose each other. A connector for accommodating an external connector is formed by the first insertion portion 22 and the second insertion portion 26 being coupled together. Note that the casing 2 is formed of a resin material such as polypropylene, polyethylene terephthalate, or ABS.

Further, in the first casing 2A, a plurality of engagement portions 200 each extending toward the second casing 2B are integrally formed in an outer peripheral portion of the first side wall portion 21. Each of the engagement portions 200 is provided with an engagement recess 201. On the other hand, in the second casing 2B, a plurality of projections 202 (hereinafter, referred to as engagement projections 202) each corresponding to one of the plurality of engagement portions 200 of the first casing 2A are integrally formed in the second side wall portion 24. The engagement projections 202 engage with the engagement recesses 201 of the engagement portions 200.

Note that, in the present embodiment, although the engagement portions 200 are provided in the first casing 2A and the engagement projections 202 are provided in the second casing 2B, the engagement portions may be provided in the second casing 2B and the engagement projections may be provided in the first casing 2A.

In addition, a tab 210 (hereinafter, referred to as an attachment tab 210) that protrudes outward is formed at each end portion of one side of each of the first casing 2A and the second casing 2B. The attachment tab 210 is provided with a coupling hole 211 for receiving a predetermined fastener (not illustrated) inserted through the coupling hole 211. The first casing 2A and the second casing 2B are securely coupled together with the predetermined fasteners via four coupling holes 211.

Further, in the first casing 2A, cylindrical protrusions 221 protruding from the first surface portion 20 are formed. Each of the cylindrical protrusions 221 has a first through-hole 220 for receiving a fastener such as a bolt or a screw (not illustrated) inserted through the first through-hole 220. The second casing 2B is provided with second through-holes 222. The protrusions 221 are fitted into the second through-holes 222.

The motor 3 may be a known motor such as a stepping motor or a brushless motor. In the illustrated example, the motor 3 is a DC motor, and a worm 40 included in the set of gears 4 is attached to a rotation shaft 311 of the motor 3. Electric power is supplied to the motor 3 from the external connector via a connection terminal 8 and a flexible substrate 7. The connection terminal 8 is provided in an insertion port 27 formed by the first insertion portion 22 of the first casing 2A and the second insertion portion 26 of the second casing 2B.

The set of gears 4 includes the worm 40, a first transmission gear 41, a second transmission gear 42, and an output gear 43 (a rotating body). The worm 40 rotates with the rotation shaft 311 of the motor 3. A top portion 40b of the worm 40 on the side opposite to the motor 3 is rotatably supported by the second casing 2B.

Rotation of the worm 40 is transmitted to a helical gear 41a of the first transmission gear 41 and is transmitted to the second transmission gear 42 via a small diameter gear 41b being coaxially provided with the helical gear 41a and having a relatively small diameter compared to the helical gear 41a. The rotation of the second transmission gear 42 is transmitted to the output gear 43. An output shaft 44 is connected to the output gear 43. The rotation of the motor 3 is decelerated at a predetermined deceleration rate and output from the output shaft 44 to the outside.

The rotation angle detection sensor 5 detects the rotation angle of the output gear 43 to control the rotation angle of the output gear 43.

Figure 5:
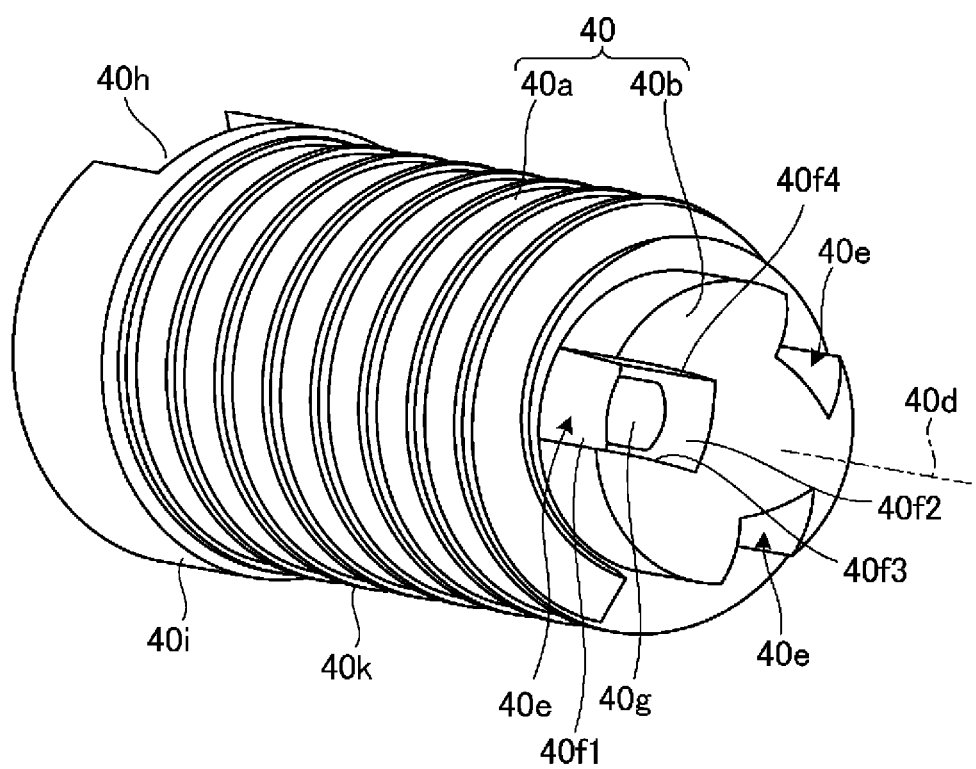
FIG. 5 is a perspective view of a worm.
Figure 6:
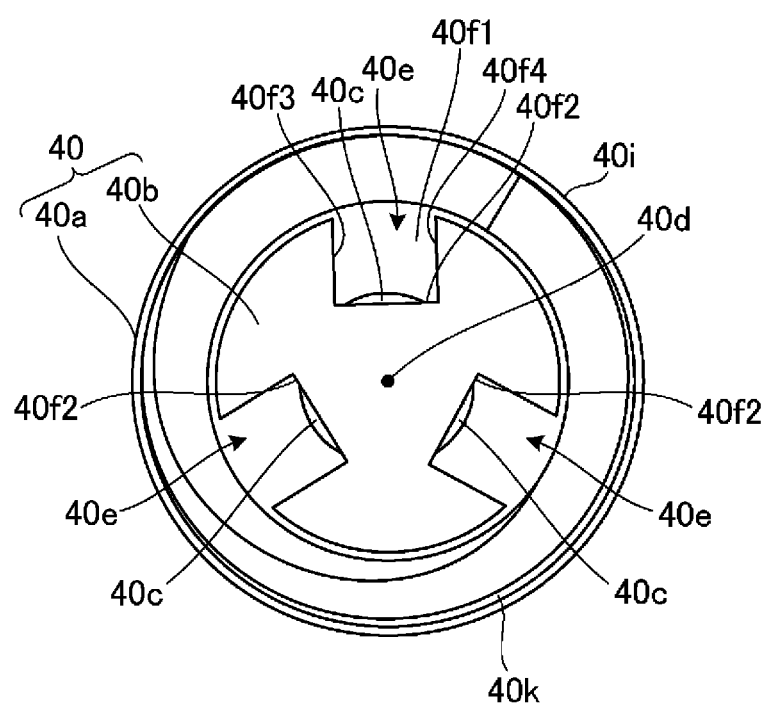
FIG. 6 is a front view of the worm as viewed from an end side.
Figure 7:
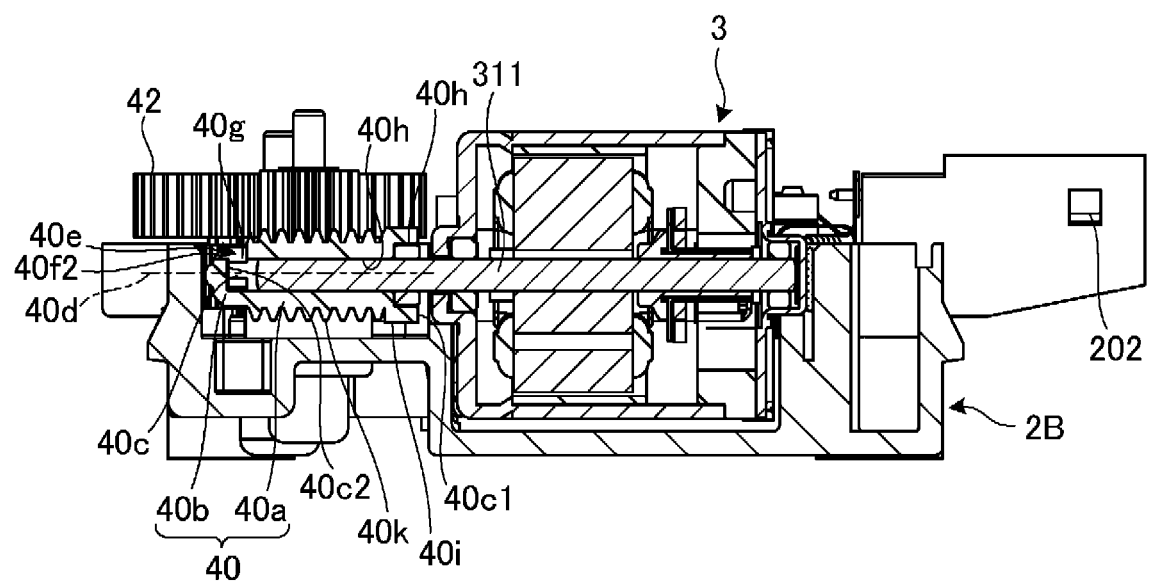
FIG. 7 is a cross-sectional view taken along VII-VII of FIG. 4.
Figure 8:
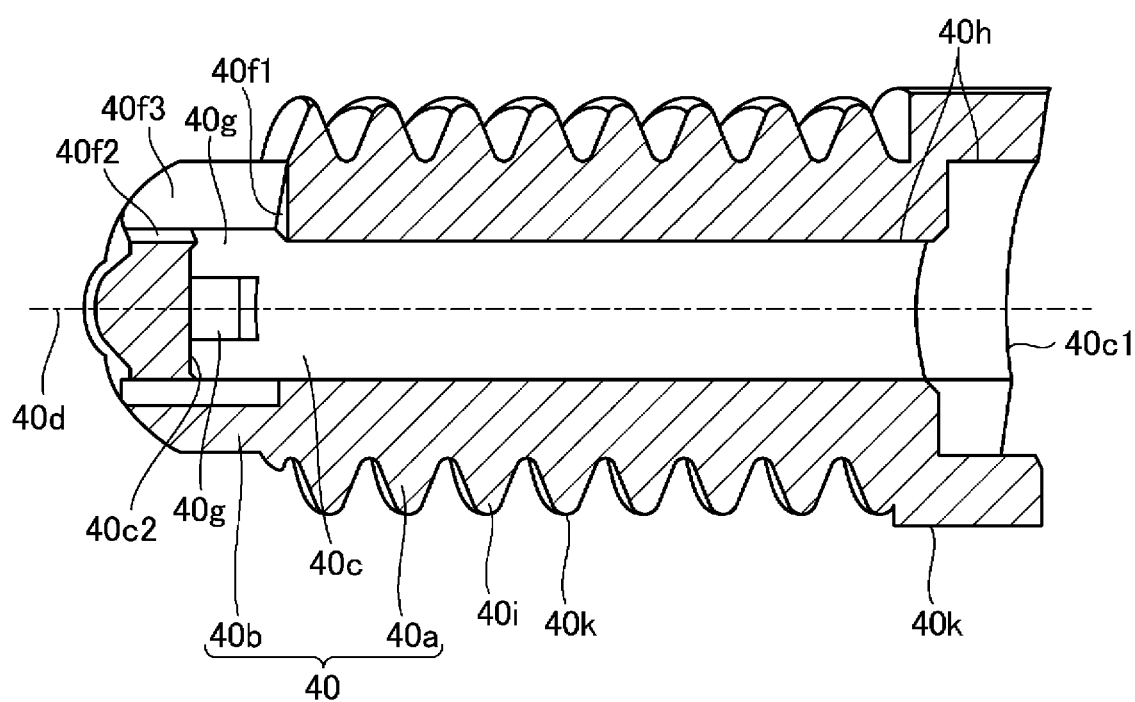
FIG. 8 is a perspective view illustrating a part of a cross section of the worm.

Next, the worm 40 will be described with reference to FIGS. 5 to 8. FIG. 5 is a perspective view of the worm 40. FIG. 6 is a front view of the worm 40 as viewed from an end side. FIG. 7 is a cross-sectional view taken along VII-VII of FIG. 4. FIG. 8 is a perspective view illustrating a part of a cross section of the worm 40.

The worm 40 includes a resin member. The resin member has an inner peripheral portion 40h forming a cavity (referred to as a hole in the following paragraphs) 40c having a longitudinal axis 40d, and an outer peripheral portion 40i. A helical tooth 40k is formed at the outer peripheral portion 40i. The resin member has a tubular shape.

When the output shaft 44 of the motor 3 is attached to the worm 40, the longitudinal axis 40d coincides with the rotation shaft 311. In the direction of the longitudinal axis 40d, the resin member or the hole 40c has a first end portion 40c1 being an open end portion and a second end portion (referred to as an end portion of a gear portion 40a on a side opposite to the motor 3 in the following paragraphs) 40c2 being a closed end portion. An axis of the outer peripheral portion 40i is the longitudinal axis 40d. In the direction of the longitudinal axis 40d, three or more recesses 40e are formed in an outer surface of the end portion 40c2 of the gear portion 40a of the resin member on the side opposite to the motor 3. Each of the three or more recesses 40e has a hole portion (referred to as a communication hole in the following paragraphs) 40g in communication with the hole 40c.

The worm 40 is made of a resin and is formed by injection molding, for example. The worm 40 includes the gear portion 40a having the inner peripheral portion 40h and the outer peripheral portion 40i, the helical tooth 40k being formed at the outer peripheral portion 40i, and a second end portion (hereinafter, referred to as a top portion) 40b.

The gear portion 40a has a tubular shape. The hole 40c is formed in the gear portion 40a and the rotation shaft 311 of the motor 3 is mounted in the hole 40c. The hole 40c is formed so as to have an axis being the longitudinal axis 40d of the worm 40. Specifically, the hole 40c includes the first end portion 40c1 being an open end portion, and the end portion 40c2 of the gear portion 40a on the side opposite to the motor 3. Note that the hole 40c is formed so as to reach a part of the top portion 40b and so as not to reach the end of the worm 40 on the side opposite to the motor 3 (the end on the second end portion 40c2 side). In other words, the hole 40c is formed so as not to pass through the worm 40.

The top portion 40b is formed on the side opposite to the motor 3 so as to be continuous with the gear portion 40a. An end of the top portion 40*b* along the longitudinal axis 40*d*, i.e., the end on the side opposite to the motor 3 is formed so as to have a curved cross section (e.g., an arc shape) along the longitudinal axis 40*d*. Specifically, the end side of the top portion 40*b* is formed into a hemisphere shape. The top portion 40*b* has an outer surface to be rotatably supported by the second casing 2B being another member and has a circumferential direction as a rotation direction. In other words, the worm 40 rotates in the circumferential direction as the rotation direction, with the outer surface in contact with the second casing 2B.

Three recesses 40*e* are formed in the top portion 40*b*. The three recesses 40*e* are provided outside of the hole 40*c* of the gear portion 40*a* in the radial direction of the hole 40*c*, i.e., outside in the radial direction of the rotation shaft 311 of the motor 3 (provided on the outer peripheral portion 40*i* side of the resin member), and are in communication with the hole 40*c* of the gear portion 40*a*. Note that it is only required that the number of the recesses 40*e* be two or more.

The recesses 40*e* are formed so as to extend along the longitudinal axis 40*d* of the worm 40, i.e., along the axial direction of the rotation shaft 311 of the motor 3. Each recess 40*e* is formed by four wall portions 40/1, 40/2, 40/3, and 40/4. The communication holes 40*g* in communication with the hole 40*c* of the gear portion 40*a* are formed in the wall portions 40/1 and 40/2. Each communication hole 40*g* is formed so as to oppose the hole 40*c* in the radial direction.

The recesses 40*e* are formed at equal intervals along the circumferential direction of the top portion 40*b*, i.e., the rotation direction of the worm 40.

Next, a molding method of the worm 40 will be described with reference to FIGS. 9A to 9D. FIGS. 9A to 9D are explanatory diagrams (1 to 4) of the molding method of the worm 40.

The worm 40 is formed by injection molding using a fixed mold 50, a first movable mold 51, and a second movable mold 52.

A pin 50*a* used for forming the hole 40*c* in the gear portion 40*a* and a part of the top portion 40*b* is formed at the fixed mold 50.

A molding surface 51*a* for forming the outer shape of the gear portion 40*a* is formed at the first movable mold 51. Furthermore, a hole 51*b* is formed in the first movable mold 51, and the second movable mold 52 is inserted into the hole 51*b*.

A molding surface 52*a* for forming the outer shape of the top portion 40*b* (the outer peripheral portion 40*i*) is formed at the second movable mold 52. Note that the second movable mold 52 has three protruding portions 52*b* that form, in the top portion 40*b*, the recesses 40*e* each having the communication hole 40*g*. The protruding portions 52*b* are provided according to the number of the recesses 40*e*.

Figure 9A:
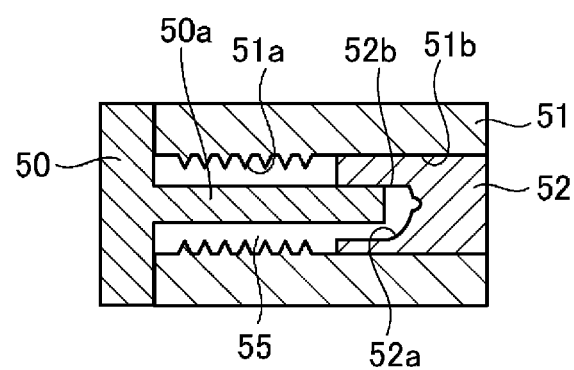
FIG. 9A is an explanatory diagram (1) of a molding method of the worm.

When the worm 40 is molded, the first movable mold 51 and the second movable mold 52 inserted in the hole 51*b* of the first movable mold 51 are moved to a predetermined molding position, as illustrated in FIG. 9A. As a result, the fixed mold 50, the first movable mold 51, and the second movable mold 52 form a cavity 55. The cavity 55 is a gap for molding the worm 40.

The three protruding portions 52*b* come into contact with the pin 50*a* of the fixed mold 50. As a result, the end on the second movable mold 52 side is put in a state of being supported by the protruding portions 52*b*.

Figure 9B:
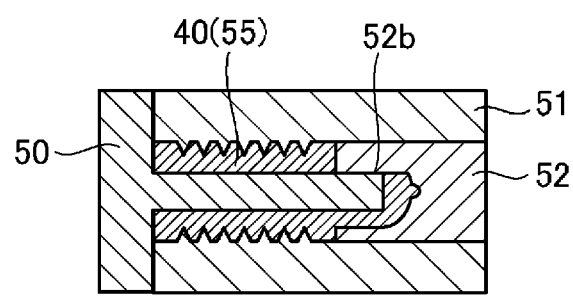
FIG. 9B is an explanatory diagram (2) of the molding method of the worm.

Then, a heated and melted resin is injected into the cavity 55 at a high pressure. As a result, the cavity 55 is filled with the resin and the worm 40 is molded, as illustrated in FIG. 9B. Note that, even when the resin is injected at a high pressure, an end of the pin 50*a* of the fixed mold 50 is prevented from bending because the pin 50*a* of the fixed mold 50 is supported by the protruding portions 52*b*.

Figure 9C:
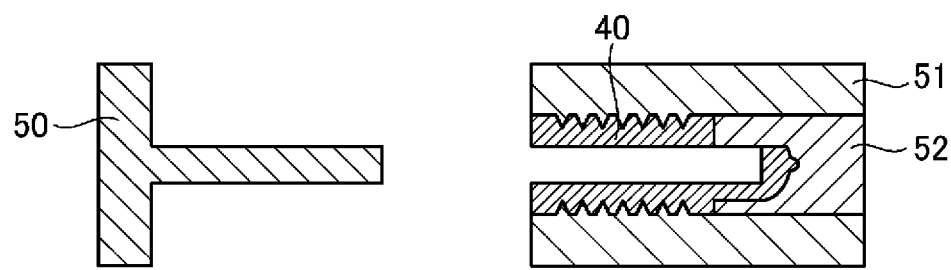
FIG. 9C is an explanatory diagram (3) of the molding method of the worm.

After cooling the resin, the first movable mold 51 and the second movable mold 52 are moved such that the worm 40 is separated from the fixed mold 50, as illustrated in FIG. 9C.

Figure 9D:
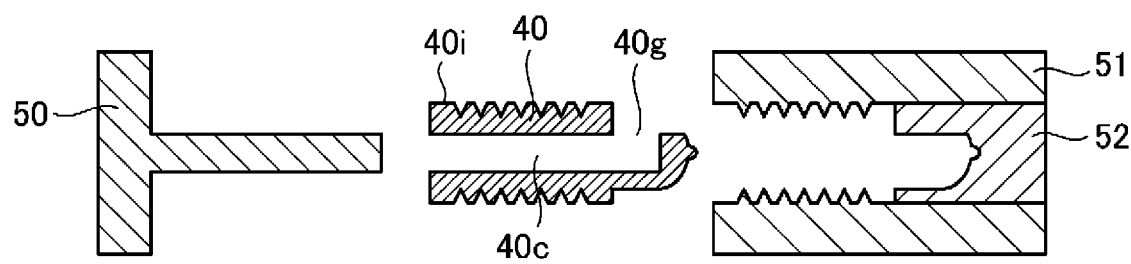
FIG. 9D is an explanatory diagram (4) of the molding method of the worm.

Then, for example, by rotating the first movable mold 51 while the second movable mold 52 is fixed, the worm 40 can be removed from the second movable mold 52, as illustrated in FIG. 9D. The hole 40*c* and the communication holes 40*g* in communication with the hole 40*c* are formed in the worm 40.

The worm 40 includes the gear portion 40*a* and the top portion 40*b*. The hole 40*c* having an axis being the longitudinal axis 40*d* of the worm 40 is formed at the gear portion 40*a*. The top portion 40*b* is formed at a first end portion of the gear portion 40*a* along the longitudinal axis 40*d*. The recesses 40*e* are formed in the top portion 40*b*, and the recesses 40*e* are located on the outer peripheral portion 40*i* side of the gear portion 40*a* with respect to the hole 40*c*, in the radial direction, and have the communication holes 40*g* in communication with the hole 40*c*.

As described above, in a case of injection molding of the worm 40, the pin 50*a* of the fixed mold 50 can be supported by the protruding portions 52*b* of the second movable mold 52 used for forming the recesses 40*e*. Thus, the pin 50*a* of the fixed mold 50 used for forming the hole 40*c* of the worm 40 for receiving the rotation shaft 311 of the motor 3 can be prevented from bending during injection molding. Thus, in the worm 40, the accuracy of the hole 40*c* of the worm 40 can be improved. And positional accuracy between the longitudinal axis 40*d* of the worm 40 and the rotation shaft 311 of the motor 3 can be improved. The worm 40 can prevent generation of vibration or undesired noise when the worm 40 is meshed with the helical gear 41*a* of the first transmission gear 41. In addition, the worm 40 can improve transmission efficiency of motive power when the worm 40 is meshed with the helical gear 41*a* of the first transmission gear 41.

Figure 10:
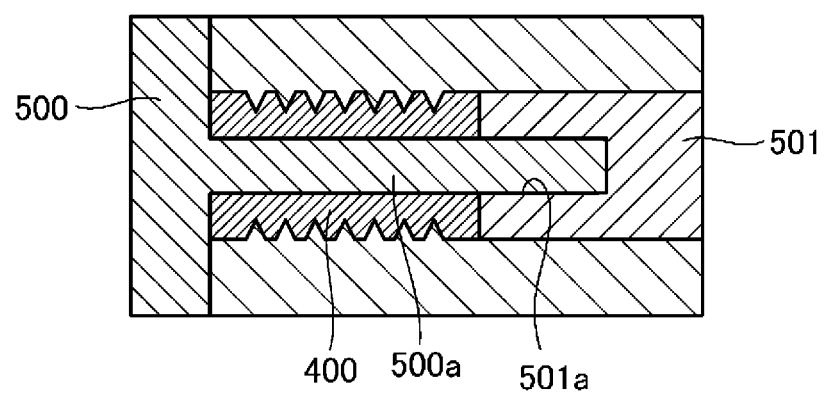
FIG. 10 is a diagram illustrating a molding method of a worm according to a comparative example.

As illustrated in FIG. 10, it can be thought that a pin 500*a* of a fixed mold 500 is inserted into a recess 501*a* formed in a second movable mold 501 to prevent the pin 500*a* of the fixed mold 500 from bending. FIG. 10 is a diagram illustrating a molding method of a worm 400 according to a comparative example.

However, in this case, a top portion cannot be formed at the worm 400, and thus an end of the worm 400 on a side opposite to the motor cannot be supported by a casing, for example. Thus, the worm 400 may bend at the end of the worm 400 on the side opposite to the motor, resulting in generation of vibration or undesired noise or a decrease in transmission efficiency of motive power.

In contrast, the top portion 40*b* on the side opposite to the motor 3 can be formed at the worm 40 according to the embodiment, and the worm 40 can rotate in the circumferential direction of the top portion 40*b* as the rotation direction, with the outer surface of the top portion 40*b* of the worm 40 in contact with the second casing 2B. Thus, the worm 40 can be prevented from bending at the end of the worm 40 on the side opposite to the motor 3, and thus the worm 40 can prevent generation of vibration or undesired noise and improve transmission efficiency of motive power.

In addition, the communication holes 40*g* of the recesses 40*e* for establishing communication between the hole 40*c* of the worm 40 and the outside allow the air inside the hole 40*c* of the worm 40 to escape through the communication hole 40*g*, when the rotation shaft 311 of the motor 3 is mounted in the hole 40c of the worm 40. Thus, the rotation shaft 311 of the motor 3 can be easily mounted to the worm 40.

In the top portion 40b, the recesses 40e are formed at equal intervals in the circumferential direction.

As a result, the pin 50a of the fixed mold 50 can be evenly supported along the circumferential direction of the pin 50a, and thus the pin 50a of the fixed mold 50 can be prevented from bending during injection molding. This can improve the accuracy of the hole 40c of the worm 40 and positional accuracy between the longitudinal axis 40d of the worm 40 and the rotation shaft 311 of the motor 3. Thus, the worm 40 can prevent generation of vibration or undesired noise and improve transmission efficiency of motive power, when the worm 40 is meshed with the helical gear 41a of the first transmission gear 41.

Figure 11:
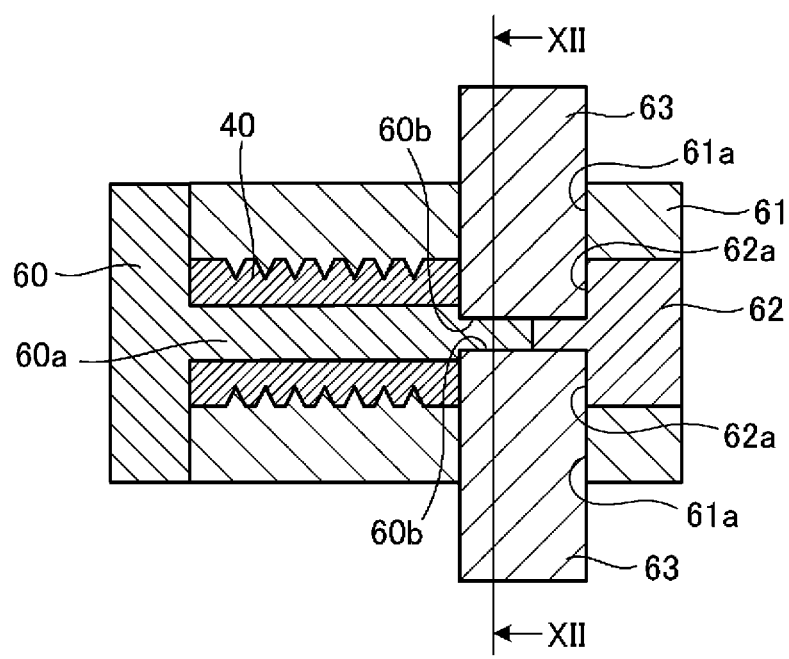
FIG. 11 is a diagram illustrating another molding method of a worm.
Figure 12:
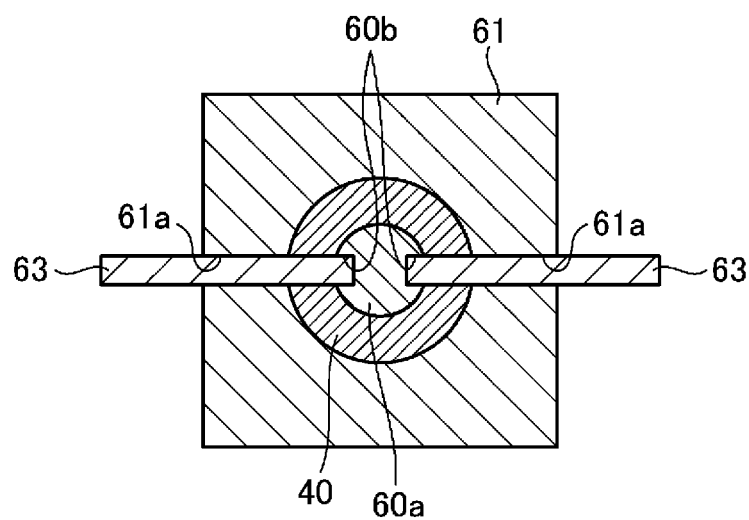
FIG. 12 is a cross-sectional view taken along XII-XII of FIG. 11.

The worm 40 may be formed by using a fixed mold 60, a first movable mold 61, a second movable mold 62, and inserts 63, as illustrated in FIGS. 11 and 12. FIG. 11 is a diagram illustrating another molding method of a worm. FIG. 12 is a cross-sectional view taken along XII-XII of FIG. 11.

In the fixed mold 60, two recesses 60b are formed at an end of the pin 60a. The two recesses 60b are formed at the end of the pin 60a so as to oppose each other. In other words, the locations of the two recesses 60b are 180 degrees different in the circumferential direction.

Two recesses 62a are formed in the second movable mold 62. The two recesses 62a communicate with the recesses 60b of the fixed mold 60 when the second movable mold 62 is inserted into the first movable mold 61. In other words, the locations of the two recesses 62a are 180 degrees different in the circumferential direction.

Two through-holes 61a are formed in the first movable mold 61. The through-holes 61a are formed so as to positionally correspond to the recesses 60b of the fixed mold 60 and the recesses 62a of the second movable mold 62. The two through-holes 61a are formed so as to oppose each other.

The recesses 60b and 62a and the through-holes 61a are formed in the fixed mold 60, the first movable mold 61, and the second movable mold 62 such that the inserts 63 can be inserted from the outside, once the first movable mold 61 and the second movable mold 62 are moved to a predetermined molding position.

The inserts 63 are inserted into the through-holes 61a and engage with the recesses 60b and 62a. In other words, as a result of engagement between the two inserts 63 and the recesses 60b, the pin 60a of the fixed mold 60 is fixed. In the above-described state, a heated and melted resin is injected at a high pressure to form the worm 40. As a result, two recesses 40e are formed in the worm 40. In the worm 40, the two recesses 40e having the communication holes 40g in communication with the hole 40c are formed at locations 180 degrees different in the circumferential direction. Each communication hole 40g is formed so as to oppose the hole 40c in the radial direction.

The worm 40 molded using the above-described mold can improve transmission efficiency of motive power and prevent generation of vibration or undesired noise, similar to the above-described embodiment.

The present invention is not limited to the embodiment described above. A configuration obtained by appropriately combining the above-mentioned constituents is also included in the present invention. Further effects and modifications can be easily derived by a person skilled in the art. Thus, a wide range of aspects of the present invention is not limited to the embodiment described above, and may be modified variously.

REFERENCE SIGNS LIST

1 Rotating device
2 Casing
2A First casing
2B Second casing
3 Motor
4 Set of gears (gear mechanism)
40 Worm
40a Gear portion
40b Top portion
40c Hole (cavity)
40c1 First end portion being open end portion
40c2 Second end portion being closed end portion
40d Longitudinal axis
40e Recess
40g Communication hole (hole portion)
40h Inner peripheral portion
40i Outer peripheral portion
41a Helical gear
50 Fixed mold
51 First movable mold
52 Second movable mold
60 Fixed mold
61 First movable mold
62 Second movable mold
63 Insert

The invention claimed is:

1. A worm made of resin and formed by injection molding, the worm comprising:
a gear portion, wherein the gear portion includes a cavity having an axis being a longitudinal axis of the worm;
a first end portion and a second end portion, the first end portion being open in the longitudinal axis of the worm,
a top portion is formed at the second end portion of the gear portion in a direction of the longitudinal axis of the worm,
a plurality of recesses including a hole portion communicating with the cavity are formed at the top portion in a radial direction, the plurality of recesses being located on an outer peripheral portion side of the gear portion with respect to the cavity,
the recess including wall portions having a first wall portion extending in a radial direction and a second wall portion extending in the direction of the longitudinal axis of the worm,
the hole portion is formed at the second wall portion,
the hole portion is arranged between a surface of the top portion and the first wall portion in the direction of the longitudinal axis of the worm, the surface of the top portion opposing the cavity,
the first wall portion is arranged in the first end portion side with respect to the surface of the top portion in the direction of the longitudinal axis of the worm, and
the hole portion is open in a direction toward the outer peripheral portion side of the gear portion from the cavity in a radial direction.

2. The worm according to claim 1, wherein
the top portion includes an outer surface to be supported by another member, and
the worm rotates in a circumferential direction of the top portion as a rotation direction, with the outer surface in contact with the other member.

3. The worm according to claim 1, wherein
in a circumferential direction, the plurality of recesses are formed at equal intervals in the top portion.

4. A worm comprising a resin member, wherein
the resin member includes:
an inner peripheral portion forming a cavity having a longitudinal axis, and
an outer peripheral portion, a helical tooth being formed at the outer peripheral portion,
in a direction of the longitudinal axis, the resin member includes a first end portion being an open end portion and a second end portion,
an axis of the outer peripheral portion is the longitudinal axis,
three or more recesses are formed in an outer surface of the second end portion of the resin member in the direction of the longitudinal axis,
the three or more recesses each include a hole portion in communication with the cavity,
the recess includes wall portions having a first wall portion extending in a radial direction and a second wall portion extending in the direction of the longitudinal axis,
the hole portion is formed at the second wall portion,
the hole portion is arranged between a surface of the second end portion and the first wall portion in the direction of the longitudinal axis, the surface of the second end portion opposing the cavity,
the first wall portion is arranged in the first end portion side with respect to the surface of the second end portion in the direction of the longitudinal axis, and
the hole portion is open in a direction toward the outer peripheral portion from the cavity in a radial direction.

5. The worm according to claim 4, wherein
the resin member includes the outer surface to be supported by another member, and
the worm rotates in a circumferential direction of the resin member as a rotation direction, with the outer surface in contact with the other member.

6. The worm according to claim 5, wherein
the three or more recesses are formed at equal intervals in a circumferential direction.

7. A rotating device, comprising:
the worm according to claim 1 and a gear meshed with the worm;
a motor having an output shaft disposed in the cavity; and
a casing accommodating the motor, the gear, and the worm, wherein
the worm rotates in a circumferential direction of the worm as a rotation direction, with a second end portion of the worm in contact with the casing.

8. The rotating device according to claim 7, wherein
in a radial direction, the hole portion is positioned so as to oppose the output shaft of the motor.

* * * * *